US011432559B2

(12) United States Patent
Massey et al.

(10) Patent No.: US 11,432,559 B2
(45) Date of Patent: *Sep. 6, 2022

(54) CLOSED LOOP RECYCLING SYSTEM AND DIP TANK FOR ANTIMICROBIAL COMPOUNDS

(71) Applicant: Safe Foods Corporation, North Little Rock, AR (US)

(72) Inventors: Justin Massey, North Little Rock, AR (US); Tim Yeaman, North Little Rock, AR (US)

(73) Assignee: SAFE FOODS CORPORATION, North Little Rock, AR (US)

( * ) Notice: Subject to any disclaimer, the term of this patent is extended or adjusted under 35 U.S.C. 154(b) by 958 days.

This patent is subject to a terminal disclaimer.

(21) Appl. No.: 15/935,176

(22) Filed: Mar. 26, 2018

(65) Prior Publication Data

US 2018/0206512 A1 Jul. 26, 2018

Related U.S. Application Data

(60) Division of application No. 14/679,546, filed on Apr. 6, 2015, now Pat. No. 10,070,659, which is a
(Continued)

(51) Int. Cl.
*A23B 4/22* (2006.01)
*A23L 3/00* (2006.01)
(Continued)

(52) U.S. Cl.
CPC ............... *A23B 4/22* (2013.01); *A23B 4/30* (2013.01); *A23L 3/001* (2013.01); *A23L 3/3454* (2013.01);
(Continued)

(58) Field of Classification Search
CPC .. A23B 4/30; A23B 4/22; A23B 7/158; A23B 7/155; B01D 2029/033;
(Continued)

(56) References Cited

U.S. PATENT DOCUMENTS 2,128,028 A 8/1938 Hampton
3,260,369 A 7/1966 Gruenewaelder
(Continued)

FOREIGN PATENT DOCUMENTS

EP 0145379 A2 6/1985
EP 0549092 B1 3/1996
(Continued)

OTHER PUBLICATIONS

International Preliminary Examination Report, dated Sep. 25, 2005, issued by the U.S. IPEA in International Application No. PCT/US03/35933.
(Continued)

*Primary Examiner* — David G Cormier
*Assistant Examiner* — Thomas Bucci
(74) *Attorney, Agent, or Firm* — Haynes and Boone, LLP

(57) ABSTRACT

A dip tank and recycling system for applying antimicrobial solution to food items, including a dip tank having a bottom and sides, and holding a liquid antimicrobial solution. A conveyor to convey food items through the tank passes through the liquid antimicrobial solution held in the tank such that food items conveyed on the conveyor are dipped in the liquid antimicrobial solution. At least two discharge nozzles spray fresh antimicrobial solution into the tank. The discharge nozzles are located in the sides of the tank, and are positioned above the level of the conveyor but below an expected top level of the liquid antimicrobial solution contained within the tank such that food items conveyed on the conveyor are agitated by the force of the spray from the
(Continued)

discharge nozzles. The spray from the discharge nozzles causes unstacking of items on the conveyor, producing an even application of the antimicrobial solution.

11 Claims, 10 Drawing Sheets

Related U.S. Application Data continuation of application No. 14/510,439, filed on Oct. 9, 2014, now Pat. No. 9,924,727.

(51) Int. Cl.
| | | |
|---|---|---|
| A23L 3/3454 | (2006.01) | |
| B01D 29/60 | (2006.01) | |
| A23L 3/3589 | (2006.01) | |
| A23B 4/30 | (2006.01) | |
| B01D 29/03 | (2006.01) | |
| B01D 33/11 | (2006.01) | |
| A23L 3/3544 | (2006.01) | |
| B01D 33/06 | (2006.01) | |
| B01D 33/48 | (2006.01) | |
| B01D 35/30 | (2006.01) | |

(52) U.S. Cl.
CPC ........... *A23L 3/3544* (2013.01); *A23L 3/3589* (2013.01); *B01D 29/03* (2013.01); *B01D 29/605* (2013.01); *B01D 33/06* (2013.01); *B01D 33/11* (2013.01); *B01D 33/48* (2013.01); *B01D 35/30* (2013.01); *A23V 2002/00* (2013.01); *B01D 2029/033* (2013.01)

(58) Field of Classification Search
CPC .. B01D 29/605; B01D 35/30; A23V 2002/00; A23V 2200/10; A23L 3/3589; A23L 3/3454; A23L 3/001
USPC ........... 134/109, 111, 135, 10, 148, 89, 95.3
See application file for complete search history.

(56) References Cited

U.S. PATENT DOCUMENTS

| | | | |
|---|---|---|---|
| 3,561,040 A | 2/1971 | Floden | |
| 3,689,958 A | 9/1972 | Dillon | |
| 3,758,257 A | 9/1973 | Dastur | |
| 4,037,338 A * | 7/1977 | Berline | B01D 33/04 210/741 |
| 4,170,240 A * | 10/1979 | Gentry | B08B 3/02 134/107 |
| 4,403,479 A * | 9/1983 | Rasovich | A23L 3/375 62/380 |
| 4,586,287 A | 5/1986 | Bleasdale et al. | |
| 4,827,727 A * | 5/1989 | Caracciolo | A01N 1/00 62/375 |
| 4,829,637 A * | 5/1989 | Norrie | A22B 5/08 452/173 |
| 4,849,237 A | 7/1989 | Hurst | |
| 4,996,070 A | 2/1991 | Nafisi-Movaghar | |
| 4,996,741 A | 3/1991 | Covell, III | |
| 5,184,471 A * | 2/1993 | Losacco | F25D 13/06 62/375 |
| 5,227,184 A * | 7/1993 | Hurst | A23B 4/24 426/321 |
| 5,314,581 A | 5/1994 | Lin et al. | |
| 5,326,308 A * | 7/1994 | Norrie | A22B 5/08 452/77 |
| 5,377,492 A * | 1/1995 | Robertson | A23L 3/375 62/375 |
| 5,399,541 A | 3/1995 | Ishii et al. | |
| 5,421,883 A | 6/1995 | Bowden | |
| 5,484,332 A * | 1/1996 | Leech | A23B 4/28 452/77 |
| 5,494,085 A | 2/1996 | Zink | |
| 5,564,159 A * | 10/1996 | Treiber | B08B 3/022 15/302 |
| 5,651,730 A | 7/1997 | McGinnis et al. | |
| 5,878,447 A * | 3/1999 | Mogab | E04H 4/14 4/508 |
| 5,879,732 A * | 3/1999 | Caracciolo, Jr. | C02F 9/00 426/81 |
| 5,882,253 A * | 3/1999 | Mostoller | A22C 21/0061 452/76 |
| 5,968,338 A | 10/1999 | Hulme et al. | |
| 6,126,810 A | 10/2000 | Fricker et al. | |
| 6,142,861 A | 11/2000 | Buhot et al. | |
| 6,514,459 B1 | 2/2003 | Crisinel et al. | |
| 7,077,738 B2 * | 7/2006 | Benson | B23Q 11/02 452/149 |
| 7,275,982 B1 | 10/2007 | Brandt | |
| 7,288,274 B2 | 10/2007 | Hilgren et al. | |
| 7,467,994 B2 | 12/2008 | Griffiths et al. | |
| 7,651,614 B2 | 1/2010 | Kelsey et al. | |
| 7,870,822 B2 | 1/2011 | Adams et al. | |
| 8,012,002 B2 | 9/2011 | Brown | |
| 8,684,799 B2 | 4/2014 | Brink et al. | |
| 9,314,049 B2 | 4/2016 | Nicholson et al. | |
| 9,924,727 B2 * | 3/2018 | Massey | B01D 33/11 |
| 2002/0064585 A1 | 5/2002 | Christianson et al. | |
| 2002/0088874 A1* | 7/2002 | Nolen | B05B 16/00 239/200 |
| 2003/0136862 A1 | 7/2003 | Filicicchia et al. | |
| 2003/0205246 A1* | 11/2003 | Christman | A47L 15/4219 134/115 R |
| 2004/0009745 A1* | 1/2004 | Tsang | A23B 4/18 452/173 |
| 2007/0025897 A1* | 2/2007 | Rheingans | A61L 2/18 422/292 |
| 2008/0241269 A1 | 10/2008 | Velasquez | |
| 2009/0196967 A1 | 8/2009 | Nolen et al. | |
| 2010/0123028 A1 | 5/2010 | Rayner | |
| 2010/0139701 A1* | 6/2010 | Bigott | A23L 5/57 134/25.3 |
| 2011/0297609 A1 | 12/2011 | Hu | |
| 2012/0060875 A1* | 3/2012 | Fauth | A47L 15/46 134/56 D |
| 2012/0100272 A1* | 4/2012 | DeVoll | A23L 3/3589 118/24 |
| 2015/0021258 A1* | 1/2015 | Massey | B01D 33/50 210/335 |
| 2015/0276455 A1* | 10/2015 | Trbojevic | A47L 15/4244 73/303 |
| 2016/0177545 A1* | 6/2016 | Robb | E03B 1/041 137/551 |

FOREIGN PATENT DOCUMENTS

| | | | | |
|---|---|---|---|---|
| EP | 2098272 B1 | 4/2011 | | |
| EP | 2777406 A1 * | 9/2014 | ............ | A23P 1/084 |
| GB | 661848 A | 11/1951 | | |
| WO | WO 2004043162 A2 | 5/2004 | | |
| WO | WO 2009105336 A1 | 8/2009 | | |
| WO | WO 2010089631 A1 | 8/2010 | | |

OTHER PUBLICATIONS

International Search Report and Written Opinion for International Application No. PCT/US2015/053404 dated Feb. 5, 2016.
Technical Examination of the Substance of the Application issued by the Ministry of Commerce and Industries of the Republic of Panama in Application No. 91583-01 dated Sep. 11, 2017.

* cited by examiner

ABSTRACT# CLOSED LOOP RECYCLING SYSTEM AND DIP TANK FOR ANTIMICROBIAL COMPOUNDS

CROSS-REFERENCE TO RELATED APPLICATIONS

This application is a Divisional of U.S. patent application Ser. No. 14/679,546 filed Apr. 6, 2015, which is a Continuation of pending U.S. patent application Ser. No. 14/510,439, filed Oct. 9, 2014, the disclosures of which are incorporated herein by reference for all purposes.

BACKGROUND

The present disclosure relates to a closed loop recycling system and dip tank for antimicrobial compounds, typically used in connection with food processing.

Recycling of antimicrobial liquids that are applied to some types of food products, such as poultry parts, presents a number of special issues, particularly concerning adulteration, contamination, and cross-contamination. U.S. patent application Ser. No. 11/409,514, filed Apr. 21, 2007, titled "Application System with Recycle and Related Use of Antimicrobial Quaternary Ammonium Compound", the entire contents of which are herein incorporated by reference, seeks to address some of these issues with an antimicrobial application system and recycle unit.

SUMMARY

In one arrangement, this disclosure relates to a dip tank for application of antimicrobial solution to food items, the dip tank including a tank having a bottom and sides, the tank holding a liquid antimicrobial solution therein. A conveyor to convey food items through the tank is included, the conveyor passing through the liquid antimicrobial solution held in the tank such that food items conveyed on the conveyor are dipped in the liquid antimicrobial solution. At least two discharge nozzles are provided for spraying fresh antimicrobial solution into the tank, the discharge nozzles being located in the sides of the tank, and positioned above the level of the conveyor but below an expected top level of the liquid antimicrobial solution contained within the tank such that food items conveyed on the conveyor are agitated by the force of the spray from the discharge nozzles. A drain is also included for draining and recycling antimicrobial solution from the tank.

The use of conveyors in the processing of meat products can result in stacking of the product. If an antimicrobial solution is applied to stacked products, there is the risk that some surfaces of the product may not receive an adequate amount of the antimicrobial solution. The submerged discharge nozzles placed above the belt and below the surface of the liquid in the dip tank causes the unstacking of products on the conveyor and therefore allows for an even application of the antimicrobial solution.

In certain arrangements, the same number of discharge nozzles can be provided on each side of the tank, for example, four discharge nozzles can be provided on each side of the tank. The discharge nozzles can be arrayed along a direction of travel of food items on the conveyor.

In some arrangements, the drain can be located on the bottom of the tank, whereas in other arrangements, the drain can be located in a side of the tank. The drain may be provided in a suction box attached to a side of the tank, and an aperture can be provided in the side of the tank for ingress of the antimicrobial solution into the suction box. A filter screen can be provided between the suction box and the tank, the filter screen at least partially covering the aperture in the side of the tank. The filter screen can include a plurality of rods having a generally circular cross-section. The filter screen does not extend to the top of the aperture in some arrangements.

The suction box can further include at least one sensor to measure a level of antimicrobial solution in the tank. The sensor can be a pressure transducer located in the bottom of the suction box.

In one arrangement, the dip tank includes an outlet section comprising a drip pan positioned to catch antimicrobial solution that drips from the food items after exiting the tank. The dip tank may also include a stop drip pan. The stop drip pan may be positioned to isolate a rinse solution that is applied to the food items in a rinse application after passing through the dip tank from the antimicrobial solution that is caught in the drip pan.

Also disclosed herein is a method of applying antimicrobial solution to food items. The method can include providing a tank having a bottom and sides, and filling the tank with a liquid antimicrobial solution to a designated level within the tank. Food items, such as poultry parts, can be conveyed through the tank with a conveyor that is submerged in the liquid antimicrobial solution held in the tank, such that the food items conveyed on the conveyor are dipped in the liquid antimicrobial solution. The method also includes spraying fresh antimicrobial solution into the tank through discharge nozzles located in the sides of the tank. The discharge nozzles are positioned above the level of the conveyor but below the top level of the liquid antimicrobial solution contained within the tank, such that food items conveyed on the conveyor are agitated by the force of the spray from the discharge nozzles. The antimicrobial solution can be drained from the tank and recycled.

In some arrangements of the method, the discharge nozzles can be arrayed along a direction of travel of food items on the conveyor, and the spray from each discharge nozzle agitates the food items in turn. The liquid antimicrobial solution can be a solution containing cetylpyridinium chloride.

In one aspect, the method includes catching in a drip pan antimicrobial solution that drips from the food items after the food items exit the tank and recycling the antimicrobial solution caught in the drip pan. The method may also include isolating with a stop drain pan a rinse solution applied to the food items during a rinse application from the antimicrobial solution.

The antimicrobial solution can be drained from the tank and continuously filtered and recycled to the discharge nozzles. In some arrangements, the antimicrobial solution drained from the tank can be filtered using a rotary screen filter.

A suction box for withdrawing liquid antimicrobial solution from a dip tank is also described herein, the suction box having a bottom and at least three side walls, and being at least partially open at a fourth side for attachment to an aperture located in a side wall of a tank. The suction box can include a filter screen in the at least partially open side for at least partially covering the aperture in the side of the tank, and a drain opening that is attachable to a suction pump for withdrawing liquid therethrough.

The filter screen can comprise a plurality of rods having a generally circular cross-section. In some arrangements, the filter screen may not extend to the top of the aperture located in the side wall of the tank.

At least one sensor can be included in the suction box to measure a level of antimicrobial solution in the tank. The sensor can be a pressure transducer located in the bottom of the suction box.

In another aspect of this disclosure, a rotary screen filter for filtering particulates from a liquid is included. The rotary screen filter can comprise a rotary drum having a screen, mesh or apertured filter portion and at least one solid portion having no apertures therein. At least one spray nozzle can be located above the rotary drum for spraying clean liquid onto the drum surface. An inlet spout can be provided for entry of liquid containing particulates, the inlet spout being located in the interior of the rotary drum. The inlet spout can discharge liquid onto the solid portion of the rotary drum. A collection tank can be located underneath the rotary drum for collecting fluid filtered by the filter portion. A screw impeller can be provided on the interior of the rotary drum, such that rotation of the drum causes solid particulates remaining in the drum to be impelled to an end of the drum for collection.

The at least one solid portion of the rotary drum can define a rim portion of the drum. The collection tank can further include at least one drain and conduit for recycling the collected filtered fluid.

The screw impeller can be formed of a band positioned perpendicular to an inner surface of the screen portion, and extending around the inner surface of the screen portion in a spiral.

DETAILED DESCRIPTION

Figure 1:
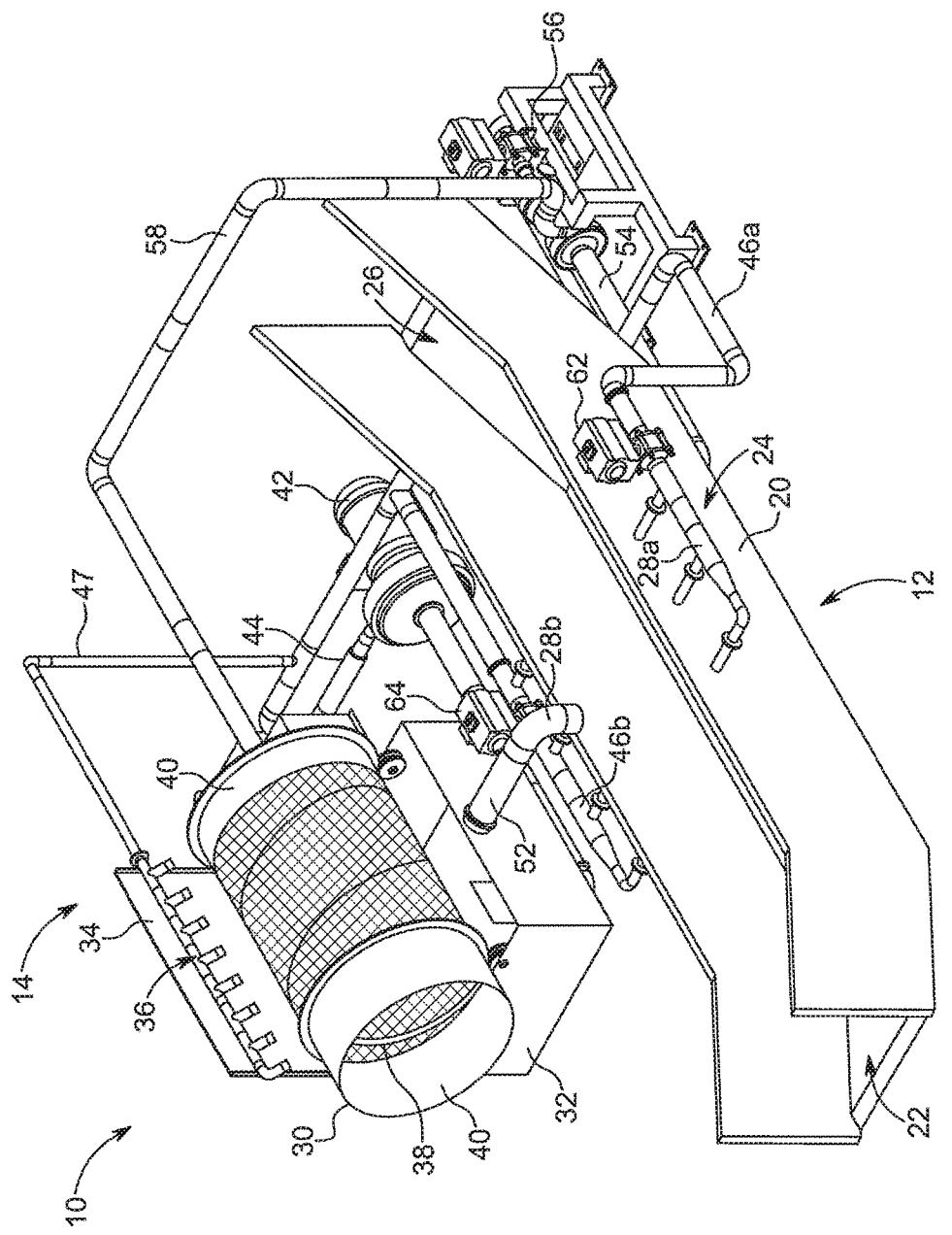
FIG. 1 is a perspective view of an antimicrobial application and recycling system according to the present disclosure.
Figure 2:
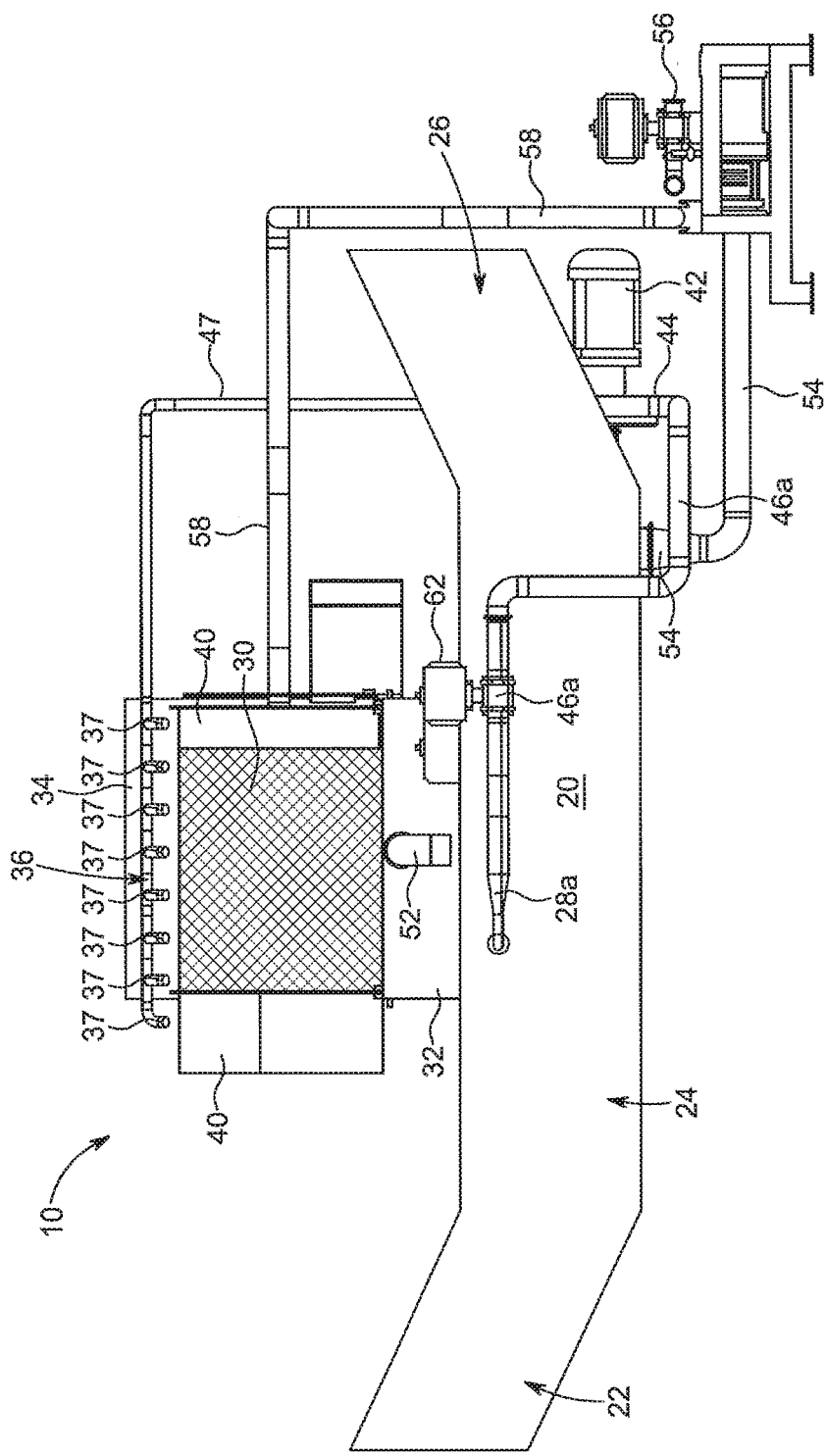
FIG. 2 is a first side view of the system of FIG. 1.
Figure 3:
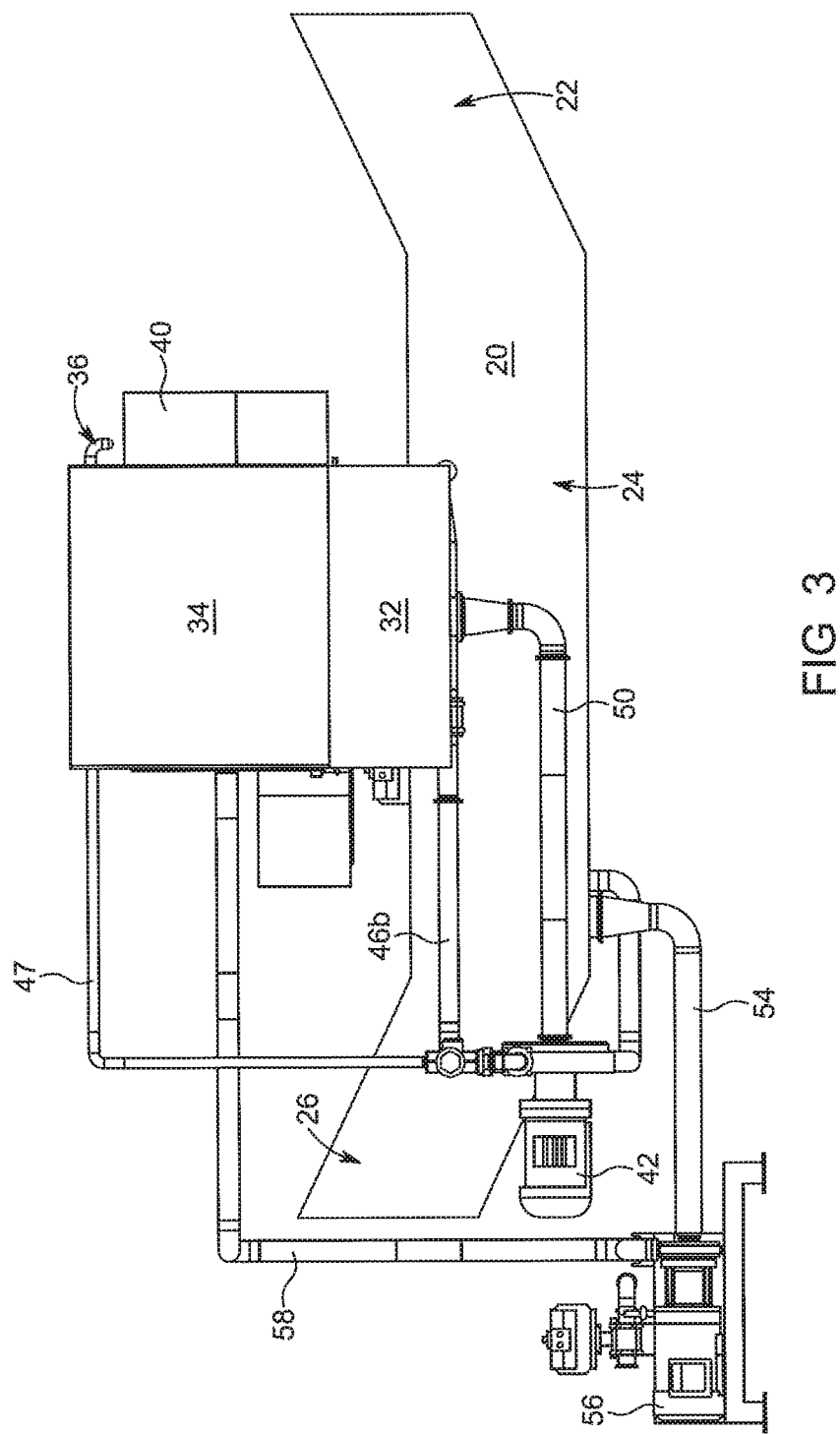
FIG. 3 is a second side view of the system of FIG. 1.
Figure 4:
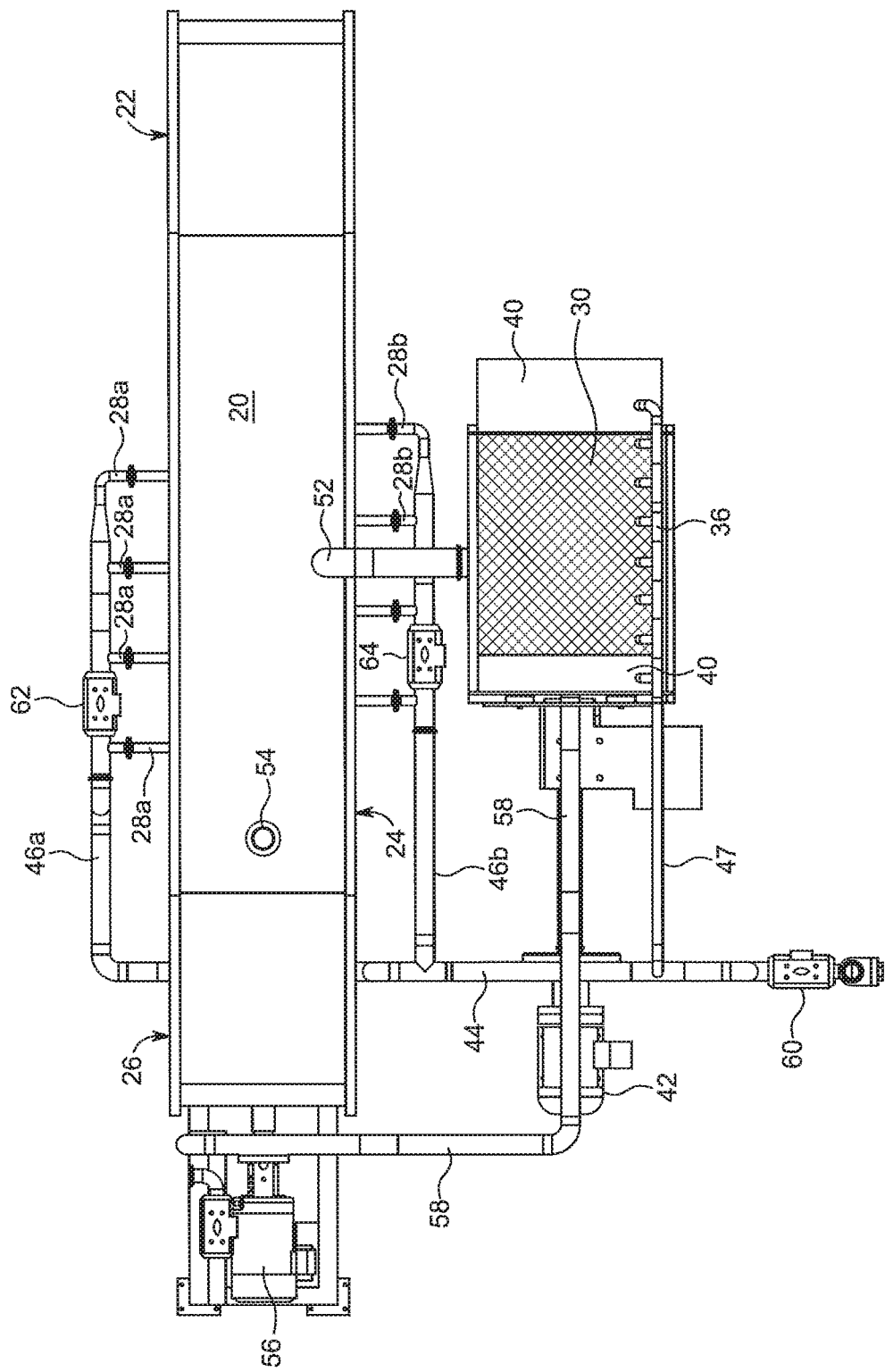
FIG. 4 is a top view of the system of FIG. 1.
Figure 5:
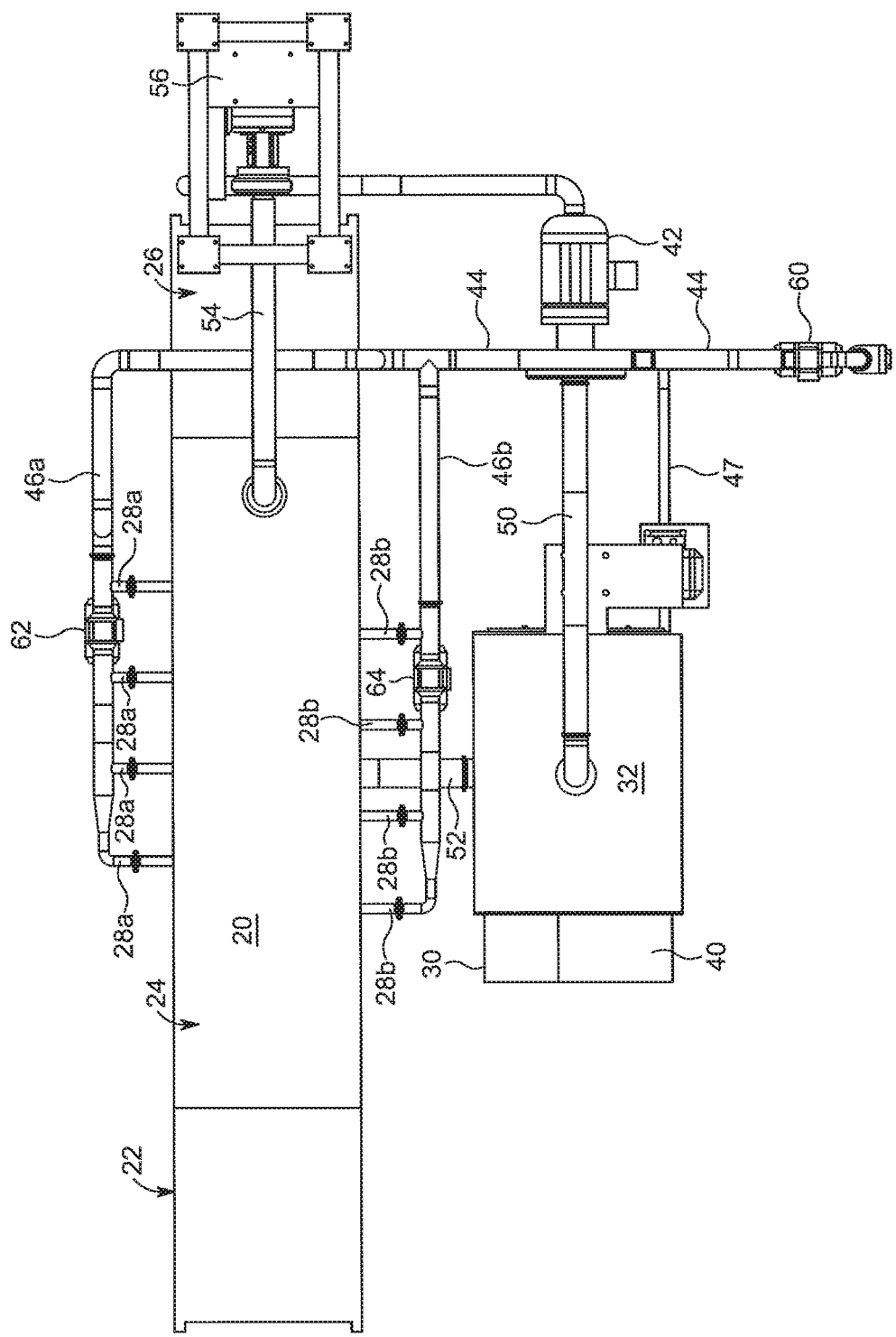
FIG. 5 is a bottom view of the system of FIG. 1.
Figure 6:
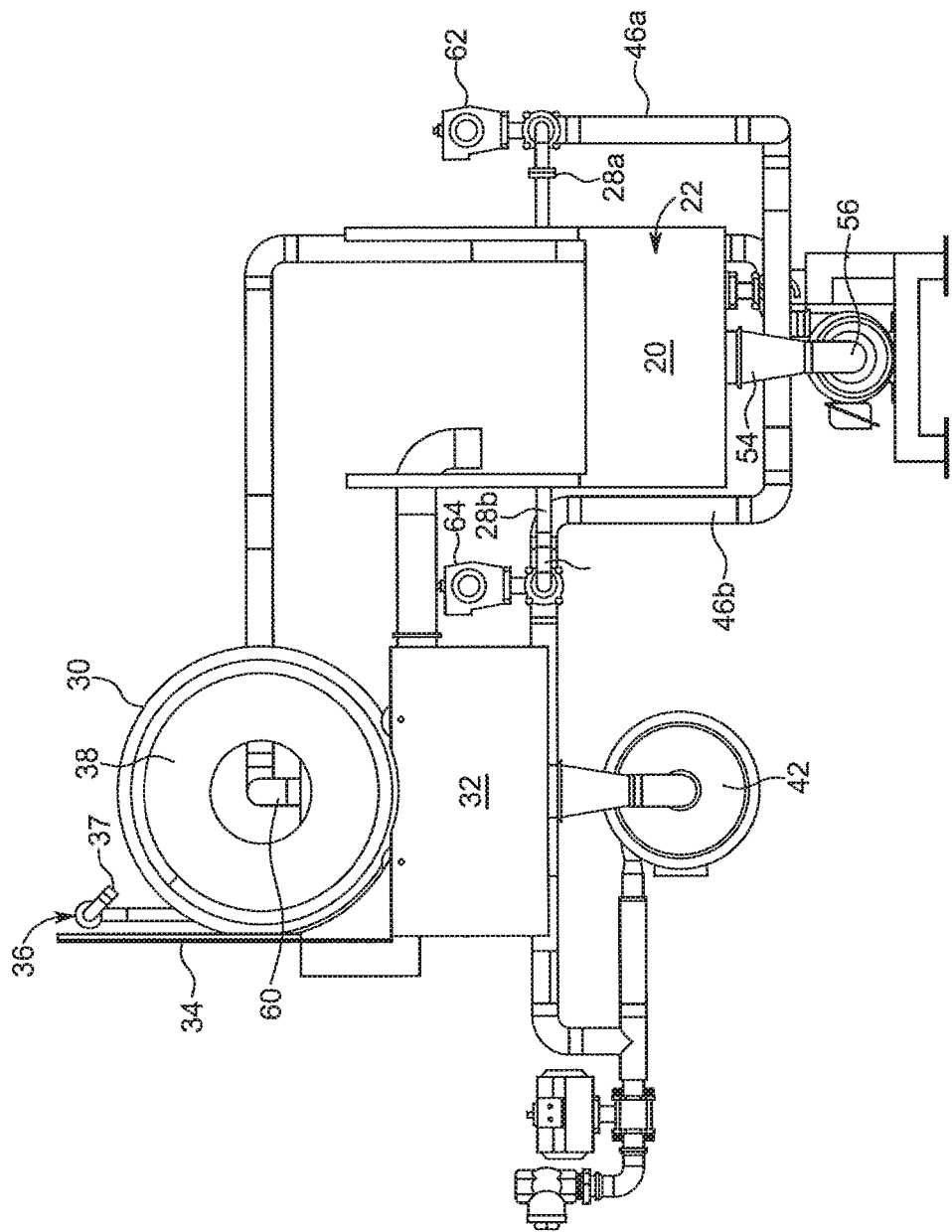
FIG. 6 is an end view of the system of FIG. 1.
Figure 7:
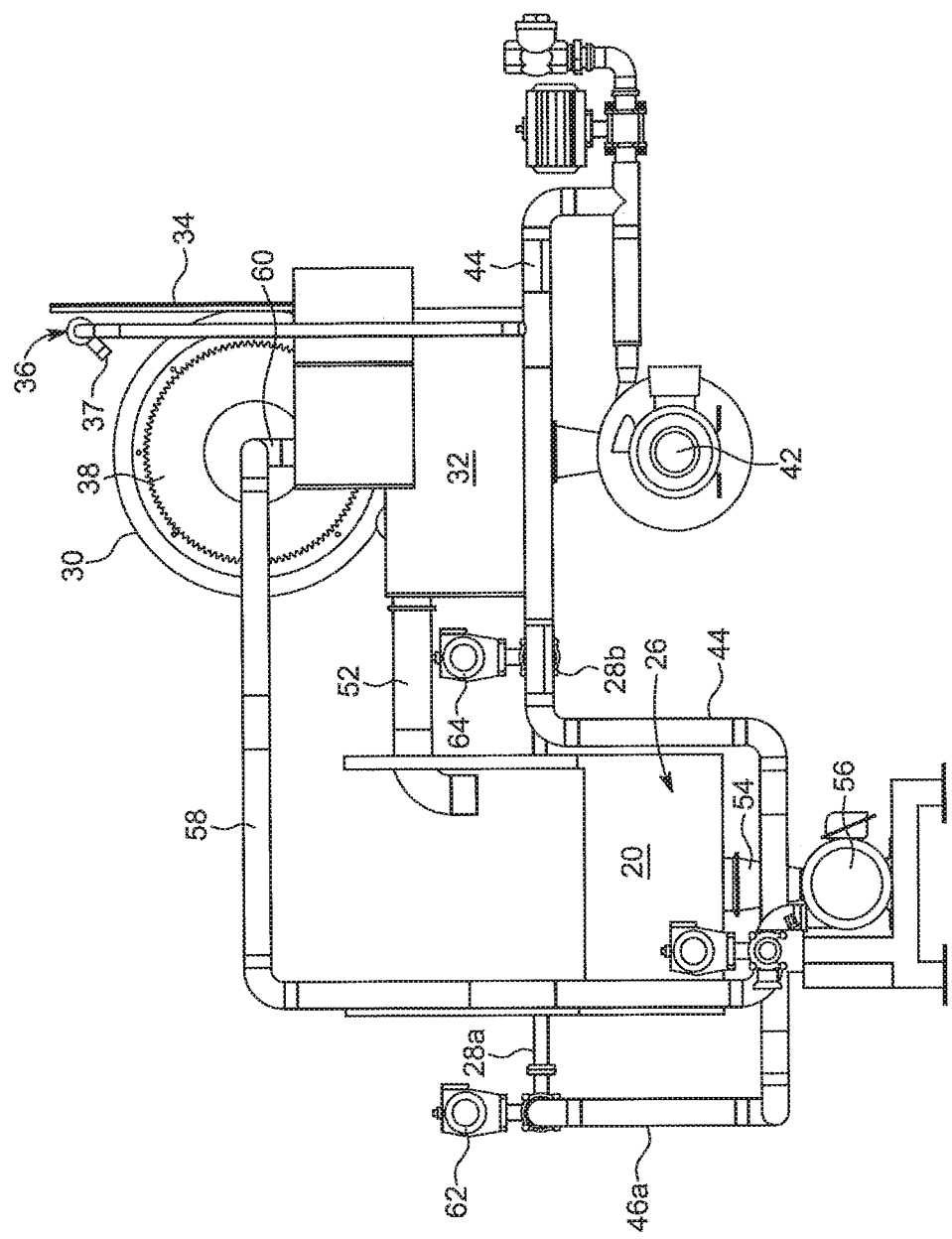
FIG. 7 is another end view of the system of FIG. 1.

Various embodiments are described and illustrated in this specification to provide an overall understanding of the composition, function, operation, and application of the disclosed system, apparatus and methods. It is understood that the various embodiments described and illustrated in this specification are non-limiting and non-exhaustive. Thus, the invention is not necessarily limited by the description of the various non-limiting and non-exhaustive embodiments disclosed in this specification. The features and characteristics illustrated or described in connection with various embodiments may be combined with the features and characteristics of other embodiments. Such modifications and variations are intended to be included within the scope of this specification. As such, the claims may be amended to recite any features or characteristics expressly or inherently described in, or otherwise expressly or inherently supported by, this specification. Further, Applicant reserves the right to amend the claims to affirmatively disclaim features or characteristics that may be present in the prior art. Therefore, any such amendments comply with the requirements of 35 U.S.C. §§ 112(a) and 132(a). The various embodiments disclosed and described in this specification can comprise, include, consist of, or consist essentially of the features and characteristics as variously described in this specification.

Also, any numerical range recited in this specification is intended to include all sub-ranges of the same numerical precision subsumed within the recited range. For example, a range of 1.0 to 10.0 is intended to include all sub-ranges between (and including) the recited minimum value of 1.0 and the recited maximum value of 10.0, that is, having a minimum value equal to or greater than 1.0 and a maximum value equal to or less than 10.0, such as, for example, 2.3 to 6.6. Any maximum numerical limitation recited in this specification is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited in this specification. All such ranges are intended to be inherently described in this specification such that amending to expressly recite any such sub-ranges would comply with the requirements of 35 U.S.C. §§ 112(a) and 132(*a*).

Any patent, publication, or other disclosure material identified in this specification is incorporated by reference into this specification in its entirety unless otherwise indicated, but only to the extent that the incorporated material does not conflict with existing descriptions, definitions, statements, or other disclosure material expressly set forth in this specification. As such, and to the extent necessary, the express disclosure as set forth in this specification supersedes any conflicting material incorporated by reference into this specification. Any material, or portion thereof, that is said to be incorporated by reference into this specification, but which conflicts with existing definitions, statements, or other disclosure material set forth in this specification, is only incorporated to the extent that no conflict arises between that incorporated material and the existing disclosure material. Applicants reserve the right to amend this specification to expressly recite any subject matter, or portion thereof, incorporated by reference into this specification.

The grammatical articles "one", "a", "an", and "the", as used in this specification, are intended to include "at least one" or "one or more", unless otherwise indicated. Thus, the articles are used in this specification to refer to one or more than one (i.e., to "at least one") of the grammatical objects of the article. By way of example, "a component" means one or more components, and thus, possibly, more than one component is contemplated and may be employed or used in an implementation of the described embodiments. Further, the use of a singular noun includes the plural, and the use of a plural noun includes the singular, unless the context of the usage requires otherwise. Additionally, the grammatical conjunctions "and" and "or" are used herein according to their accepted usage. By way of example, "x and y" refers to "x" and "y". On the other hand, "x or y" refers to "x", "y", or both "x" and "y", whereas "either x or y" refers to exclusivity.

In the processing of meat, and particularly in the processing of poultry such as chicken, sanitation of the food products and equipment during processing is extremely important. As herein described, an antimicrobial application system or methods may be employed to apply an antimicrobial solution, e.g., by spraying or dipping the food products to be processed, such as raw meat or chicken parts to reduce microbial contaminants on the meat. As herein described, an antimicrobial application system may be configured to recycle antimicrobial solutions used in connection with food processing. The recycling may include recycling of antimicrobial solution applied to items associated with food processing for subsequent application of the recycled antimicrobial solution to items associated with food processing. The antimicrobial application system may include an antimicrobial application unit and a recycle unit. An initial, dilute antimicrobial composition may be prepared and the concentration of the antimicrobial may be controlled automatically by a control unit. The control unit may include or be operatively controllable by a processor. The processor may be configured to access a data storage medium having stored therein instructions executable by the processor to perform one or more operations of the antimicrobial application system. The antimicrobial composition may be provided to the antimicrobial application unit and applied to work pieces, such as raw poultry carcasses. After application to the work pieces, the antimicrobial composition-containing solution may flow to a recycle tank of the recycle unit. The concentration of the antimicrobial in the antimicrobial solution flowing to the recycle tank may be monitored manually or by the system. Additional antimicrobial may be automatically added if the concentration of the antimicrobial in the antimicrobial solution falls below a desired amount. Additional antimicrobial may also be automatically added at a rate that approximates the rate at which the antimicrobial is depleted from the solution. All or a portion of the antimicrobial solution may be periodically diverted to a capture tank for selective removal of the antimicrobial composition from the solution. The removed antimicrobial and remaining solution are then disposed of in appropriate manners. The antimicrobial is preferably a quaternary ammonium compound, an alkylpyridinium chloride, or cetylpyridinium chloride. Various different antimicrobial solutions are suitable for use, including, for example, a solution containing cetylpyridinium chloride (CPC). One suitable antimicrobial solution is available under the name Cecure from Safe Foods Corporation.

Referring to FIGS. 1-7, reference numeral 10 refers in general to an arrangement of an antimicrobial application system according to the present disclosure. Although exemplary dimensions are given below for various components of the system, it should be appreciated that the components can be customized for different processing plants, and are therefore not intended to be limiting.

In various embodiments, the antimicrobial application system 10 may be part of a meat processing system employed by a producer or processor of meat. The antimicrobial system 10, for example, may be housed within a larger meat processing plant (not shown) with additional processing apparatuses or devices associated with the meat processing system. The system 10 generally comprises an antimicrobial application unit 12 configured to apply an antimicrobial solution to workpieces, such as raw meat or poultry carcasses or pieces. In some configurations, the antimicrobial application system 10 may further include or be configured to fluidically couple to a recycle unit 14 configured to one or more of receive, supply, retain, transport, mix, deliver, circulate, treat, measure, and filter the antimicrobial solution. For example, in one embodiment, the recycle unit 14 is configured to fluidically couple to the application unit 12 at a first end to receive antimicrobial solution from the application unit 12 and at a second end to deliver antimicrobial solution to the application unit 12. In normal operation of such a configuration, the antimicrobial solution is generally recycled through the recycle unit 14 before passing back to the antimicrobial application unit 12. At the end of an allotted time (for example, a set number of hours, a shift, a day, or longer), processing of the meat products is halted so that the equipment can be cleaned, and the antimicrobial solution is generally then routed through a capture valve 16 for capture in a capture unit (not shown). After capture, the antimicrobial solution may be discarded, or processed for further re-use, depending on the particular application.

Figure 8:
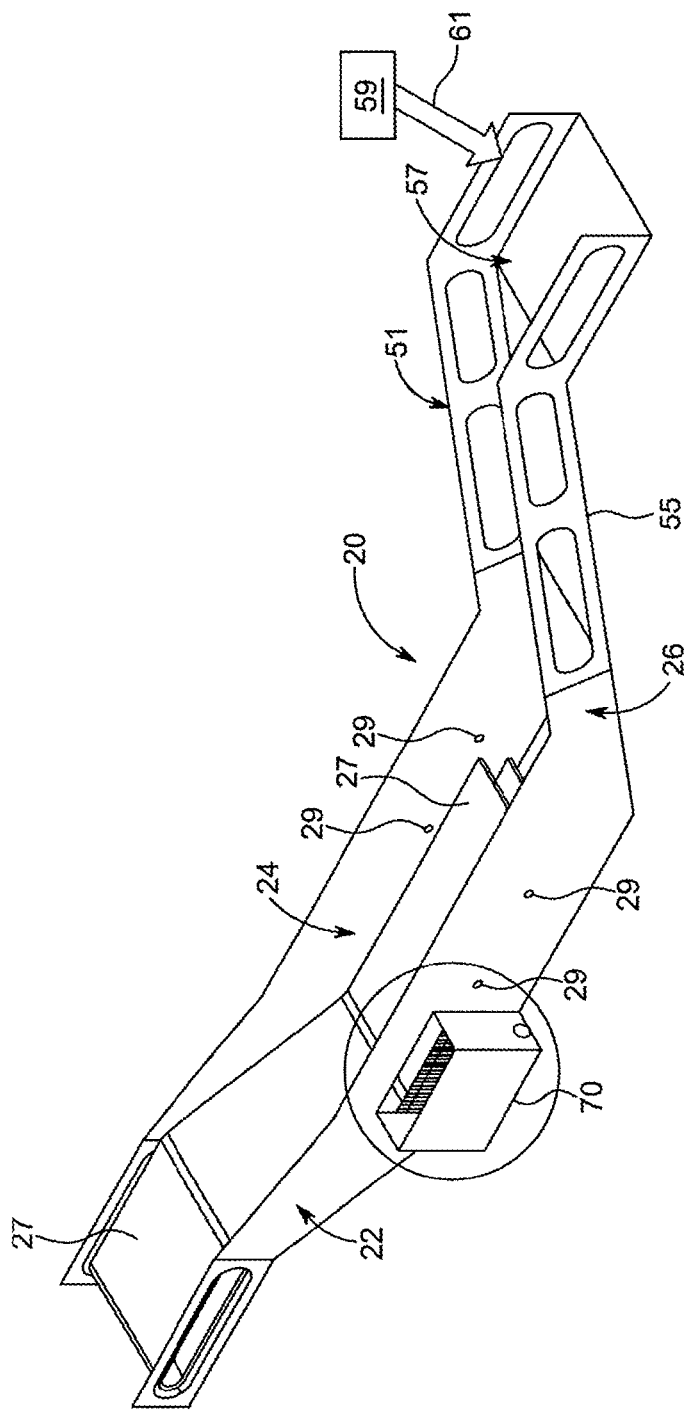
FIG. 8 is a perspective view of an alternative arrangement of dip tank and suction box for use in an antimicrobial application and recycling system according to the present disclosure.

The antimicrobial application unit 12 includes a generally rough-like dip tank 20. The dip tank 20 is connected at either end to conveyors for moving parts through the unit 12. The dip tank 20 includes an inlet section 22, a central section 24, and an outlet section 26. A conveyor (not shown) may run along the floor of the dip tank 20. The conveyer may include a moving rack, cage, hanger, or track configured to convey meat products through the dip tank 20. FIGS. 8 and 10 illustrate a conveyer 27 according to various embodiments. The conveyer 27 runs along the dip tank 20 to convey the meat products through the antimicrobial solution 53 within the dip tank 20. The control unit may be configured to maintain a preferred level 53a of antimicrobial solution 53. For clarity, only the portion of the conveyer 27 that extends along the inlet section 22 and through the initial portion of the central section 24 is shown. However, the conveyer 27 will typically extend through the length of the dip tank 20. The conveyer 27 is typically formed of or coated with a noncorrosive material to limit corrosive effects of the antimicrobial solution. The conveyer 27 may include vertical flights to ensure that the meat products are kept continually moving through the dip tank 20. In one embodiment, the conveyer 27 may be a polyethylene belt, and the flights may be 3" tall and spaced every 12" along the belt, although the particular form of the flights will typically be selected in consideration of the product being processed and can vary. These flights may be formed of solid pieces of polyethylene or propylene, for example. The outlet section 24 may include a drip region or drip pan 51 for recycling of excess antimicrobial solution. For example, the drip pan 51 may be positioned downstream of the antimicrobial solution 53 held in the dip tank 20 to catch excess antimicrobial solution from meat products or the conveyer that may be released along the outlet section 26. In one embodiment, the drip pan 51 includes a drain to collect the antimicrobial solution caught in the drip pan 51. The collected antimicrobial solution may then be recycled, e.g., returned to the bulk of the antimicrobial solution held in the drip tank 20. The drip pan 51 may also be positioned at an angle toward the central section 24 to direct the antimicrobial solution caught by the drip pan 51 toward the bulk of the antimicrobial solution 53 held in the dip tank 20. The dip tanks illustrated in FIGS. 1-10 are also equipped with discharge manifolds 28a and 28b provided on each side of the central section 24, and extend through apertures 29 in the sides of the tank 20.

With reference again to FIGS. 1-7, the recycle unit 14 includes a rotary screen filter 30, a rotary screen reservoir 32, a rotary screen shield 34, and a cleaning unit 36 which may include a rotary screen spray bar. The interior of the rotary screen filter 30 is provided with a screw impeller 38, and each end of the rotary screen includes a solid section 40. The rotary screen filter 30 may be, for example, a 24" diameter stainless steel drum having $1/16$ inch perforated holes therein. It will be appreciated that any suitable type and size of screen, such as a mesh or different hole sizes or patterns, may be employed. The screw impeller 38 may take the form of a single thread that is about 2" high, and which spirals around the interior of the rotary screen filter 30 to form bands that are about 12" apart.

In various embodiments, the recycle unit 14 includes a rotary screen filter 30 configured to filter solid components from recycled antimicrobial solution. For example, during application of antimicrobial solution to workpieces solids may pass into the antimicrobial solution. The solid components may include, for example, large particles, solids, solids associated with liquids, viscous liquids, fat, gelatinous material, debris, or other materials that may be filtered from the effluent via passage through the size restrictive screen filter 30. One or more additional filters (not shown) may be included in the antimicrobial application system 10, particularly for removing large particles and solids.

The screen filter may include a body including a filter portion 30 positioned between ends 40 of the body. The body may include an annular wall 31 defining a bore that extends along a rotation axis "R" about which the filter portion 30 is configured to rotate as indicated by arrow 33. In various embodiments, the filter portion 30 may be constructed from strips of material patterned or cross-laid to form a plurality of holes or a mesh. The body 30 may also be constructed from a tube or drum through which perforations are formed to define the holes of the mesh 35 between an inwardly facing surface and an outwardly facing surface of the annular wall 31. The screen filter 30 is preferably coated with or formed of materials resilient to corrosion, e.g., anti-corrosives, stainless steel, synthetics, polymers, plastics, ceramics, etc. The holes of the mesh 35 may be dimensioned to obstruct passage of the solid component having a minimum size or cross-section while allowing passage of the remaining effluent. In one preferred embodiment, the holes of the mesh 35 are sized to define cross-sections of about 0.0625 inches, however, the mesh 35 may include smaller or larger holes as well as fewer or additional holes, e.g., in consideration of the amount, size, or retention characteristics the solid components, rate or quantity of effluent, rotation rate or area of the filter portion, etc. In at least one embodiment, the mesh 35 of the filter portion 30 includes holes having different sized cross-sections.

A primary pump 42 pumps clean antimicrobial solution around the system. The primary pump 42 is connected to a first distribution conduit 44, from which extend manifold distribution conduits 46a and 46b that are connected to the discharge manifolds 28a and 28b. The distribution conduit 44 can be, for example, a 2" diameter pipe, and a 2" to 1" reducer can be included in the pipe close to the discharge manifolds 28a and 28b. A further distribution conduit 47 is connected between the distribution conduit 44 and the cleaning unit 36.

The discharge manifolds 28a and 28b are located underneath the expected surface of the antimicrobial liquid in the dip tank 20, but above the level of a conveyor belt passing through the dip tank 20. The discharge manifolds 28a and 28b shoot the antimicrobial solution liquid across the reservoir in the dip tank 20, which helps to flip and roll meat products being conveyed therethrough, and therefore unstacks the otherwise stacked product. This allows for an even contacting of all surfaces of the meat product with the antimicrobial solution, which is important to non-oxidative antimicrobial technology such as a CPC-based solution. As CPC has a tendency to foam, submerging the discharge manifolds underneath the expected surface of the liquid in the dip tank 20 helps to reduce foaming.

Underneath the dip tank 20 in the arrangement shown in FIG. 1, a drain conduit 54 is provided. The drain conduit 54 is the primary drain for the dip tank 20, and will receive antimicrobial solution directly after it has been applied to the meat products in the dip tank 20. As this solution will contain organic solids and other particles, the drain conduit 54 may have, for example, an initial diameter of 4" that may pass through a reducer to a 2.5" pipe. Drain conduit 54 is connected to a solids pump 56. A recycle conduit 58 leads from the solids pump 56 to the rotary screen filter 30, and may have, for example, a diameter of 2".

The recycle conduit 58 may include an outlet 60 adjacent to an end 40 of the screen filter 30 that is positioned to deliver effluent into the bore of the screen filter 30. In at least one embodiment, the recycle conduit 58 extends partially within the screen filter 30 and the outlet 60 may include a downspout directed toward or positioned to deliver the effluent to a delivery region that extends along an inwardly facing surface of the annular wall of the screen filter 30. The delivery region may include a band forming one end 40 defining a perimeter of the bore. The band may be formed of the same or a different material as the filter portion 30. The band 40 may have a solid or continuous inwardly facing surface 41 with respect to the bore. The inwardly facing surface 41 may be smooth to discourage accumulation of solid component or from otherwise obstructing flow of effluent from the delivery region toward the filter portion 35. For example, the inwardly facing surface 41 may include a polished metallic surface. In at least one embodiment, the inwardly facing surface 41 of the band 40 may be textured to include grooves or projections. The grooves may be oriented to provide fluid paths for effluent directed toward the filter portion or to breakup solid components. In one embodiment, the inwardly facing surface 41 may be treated or coated with a non-stick material to discourage accumulation of solid component. In some embodiments, the absence of holes defined in the inwardly facing surface 41 of the band 40 may allow effluent to be delivered into the bore onto the inwardly facing surface 41 while avoiding forcing accompanying solid component onto the filter portion 35 where it may become lodged. The screen filter 30 may include bands 40 positioned at both ends of the body. However, in at least one embodiment, the screen filter 30 includes only one band 40. The screw impeller 38 on the interior of the rotary screen filter 30 helps to move solid particles to the other end 40 of the rotary screen filter, where the particles can fall out of the rotary screen filter into a collection container (not shown) for provision to a further meat processing step, for disposal, or recycling, depending on the application.

In a further embodiment, a lip or ridge may be disposed at an end of the body of the screen filter 30 adjacent to the delivery region to prevent effluent from exiting the bore without passing onto the filter portion 35. In at least one embodiment, however, the inwardly facing surface of the band 40 may be positioned at a raised angle with respect to the horizontal to urge the effluent directed onto the inwardly facing surface 41 of the band 40 toward the filter portion 35 of the screen filter 30. The raised angle may position the inwardly facing surface 41 to oppose the direction of effluent flow with respect to its release from the outlet 60 to redirect the effluent toward the filter portion 35 or may complement the general direction of flow of the effluent toward the filter portion 35. In this or other embodiments, the body 35 of the screen filter 30 may be positioned at an angle with respect to the horizontal such that one end thereof is raised relative to the opposing end. The angle of the body 35 may further angle the inwardly facing surface extending along the filter portion 35. Accordingly, the outlet 60 of the recycle conduit 58 may be positioned to release effluent onto the inwardly facing surface 41 at a high end of the band 40. In these or other embodiments, the outlet 60 may be angled to direct the effluent into the bore or onto the inwardly facing surface 41 of the band 40 at a perpendicular, parallel, or other angle in-between.

As introduced above, the filter portion 35 of the screen filter 30 may be configured to rotate about a rotation axis R as generally identified by arrow 33. In at least one embodiment, the body 35 of the screen filter 30, which may include the band 40, may also be configured to rotate with the filter portion 35. The rotation may be driven by any suitable mechanism configurable to rotate the filter portion 35 of the screen filter 30, such as gears, pulleys, motors, etc.

In at least one embodiment, the screen filter 30 includes a screw impeller 38 configured to urge effluent through the bore. For example, the screw 38 may be configured to urge liquid portions of the effluent along the inwardly facing surface of the annular wall of the screen filter 30, such as the inwardly facing surface 41 of the band 40, toward the filter portion 35. The screw 38 may also be configured to urge solid components along the annular wall through the bore of the screen filter 30 toward a solids trap (not shown). The solids trap may, for example, be located at an end of the body 35 where solid components may be released for disposal. The screw 38 may include a thread protruding from the annular wall toward the rotation axis R. The thread may wrap around the annular wall within the bore between the ends 40 of the body 35 to form a helix therein. The thread may be directionally oriented to complement the rotation of the filter portion 35 to direct separated solid components toward an end 40 of the bore where the solid components may then be passed for disposal. For example, the thread may wrap around the inwardly facing surface in a clockwise or counterclockwise direction with respect to an end 40 of the body 35 to directionally urge solid components toward or away from the end 40 of the body 35 as induced by the direction of rotation and location of the delivery region.

In various embodiments, the screen filter 30 may include or be configured for implementation with a cleaning unit 36. In one form, the cleaning unit 36 may be a spray bar, and may be used to clean one or more portions of the screen filter 30, e.g., dislodge solid components from the annular wall or filter portion 35, provide additional lubrication to encourage passage or solid components through the bore, discourage accumulation of solid components on annular wall or filter portion 35, etc. The cleaning unit 36 may be equipped with a scraper configured to implement cleaning operations of the cleaning unit 36. The scraper may be positioned within or outside the bore. In various embodiments, the scraper may employ various mechanisms to scrape the screen filter 30. For example, the scraper may include one or more extensions such as bristles or rigid or elastomeric flaps, for example, configured to contact the inwardly or outwardly facing surfaces of the annular wall or body 35 of the filter screen 30.

In the illustrated embodiment, the cleaning unit 36 includes a spray bar having one or more fluid ports 37 configured to direct a fluid onto the annular wall to clean the screen filter 30, e.g., to dislodge solid components from the filter portion 35 or encourage solid components to move along a lower portion of the bore of the filter screen 30 by the action of the screw 38. In at least one embodiment, the spray bar of the cleaning unit 36 is positioned within the bore to direct fluid onto the inwardly facing surface of the annular wall, e.g., along the filter portion 35 or bands 40. In some embodiments, the cleaning unit 36 includes multiple spray bars or fluid ports 37 which may also be positioned around the body 35 or both within the bore and along the outwardly facing surface. The fluid ports 37 may include nozzles configured to directionally enhance or modulate distribution of the cleaning fluid. In certain embodiments, the fluid ports 37 may be statically positioned. Regulation of volume or pressure of cleaning fluid directed from the fluid portions may be modulated using pumps, restriction or obstructive elements, valves, etc. For example, in one embodiment, an orifice plate may be disposed in the cleaning unit 36. The orifice plate may be positioned to modulate flow for a single or multiple fluid ports 37, for example. In at least one embodiment, the fluid ports 37 may be movable via a central control unit, e.g., in a predetermined or programmed pattern or selectively, which may include sensors configured to sense locations in need of the cleaning action of the fluid and that which send such data to the central control unit for automated directing. In this or another embodiment, the fluid ports 37 may be manually directed via remote controls provided by a user remote control system incorporated with the central control unit.

A distribution conduit 47 is connected to first distribution conduit 44, and provides clean antimicrobial solution to the cleaning unit 36. The distribution conduit 47 may be, for example, a 1" diameter pipe. Antimicrobial solution is filtered through the rotary screen filter 30, and falls on the flow of solid particles being impelled through the rotary filter screen 30, and then out through the bottom of the filter into the rotary screen reservoir 32.

Two outlets are provided in the rotary screen reservoir 32, and are connected to respective conduits. A recycle conduit 50 is connected to an outlet in the bottom of the rotary screen reservoir 32, and is connected in with the first distribution conduit 44 and primary pump 42. An overflow pipe 52 is connected to an outlet at an upper edge of the rotary screen reservoir 32. Overflow pipe 52 is located generally higher than the expected liquid level in the rotary screen reservoir, and may be, for example, a 3" diameter pipe. The overflow pipe 52 can be directed to the top of dip tank 20, and does not need to include a pump as the rotary screen reservoir 32 is positioned above the level of the dip tank 20.

In a normal work shift, the antimicrobial fluid is constantly filtered and recycled in real time, in a closed loop system, which has a high level of recycling efficiency that retains all of the antimicrobial solution therein. Three capture valves 60, 62, and 64 are provided in the conduit systems so that at the end of a shift, the antimicrobial solution flow can be stopped and can be drained to a capture pipe 66 for capture and further processing. It will be noted that fluid flowing into the capture pipe 66 has been filtered by the rotary screen filter 30 during both the recycle process, and the drain process. This allows the capture line to include a finer grade of filter, such as a carbon filter without having to provide an additional large-scale filter.

Figure 9:
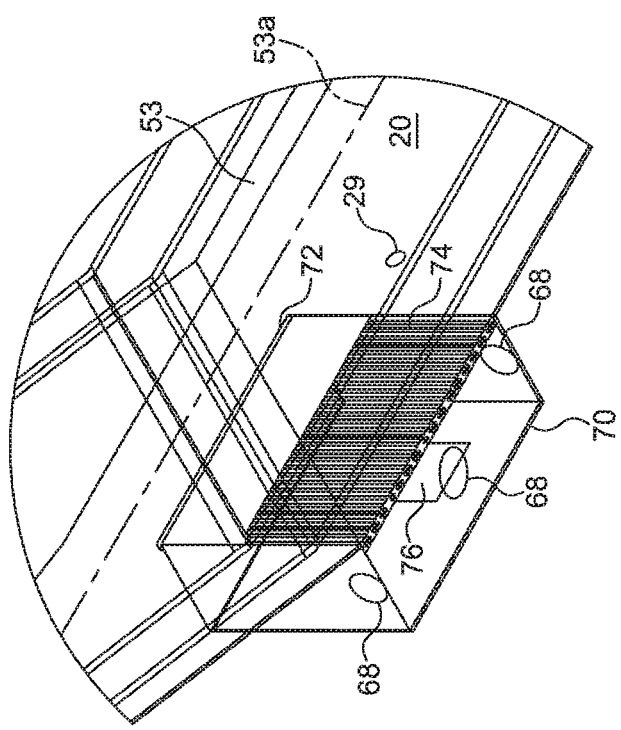
FIG. 9 is a detail view of the suction box of FIG. 8.
Figure 10:
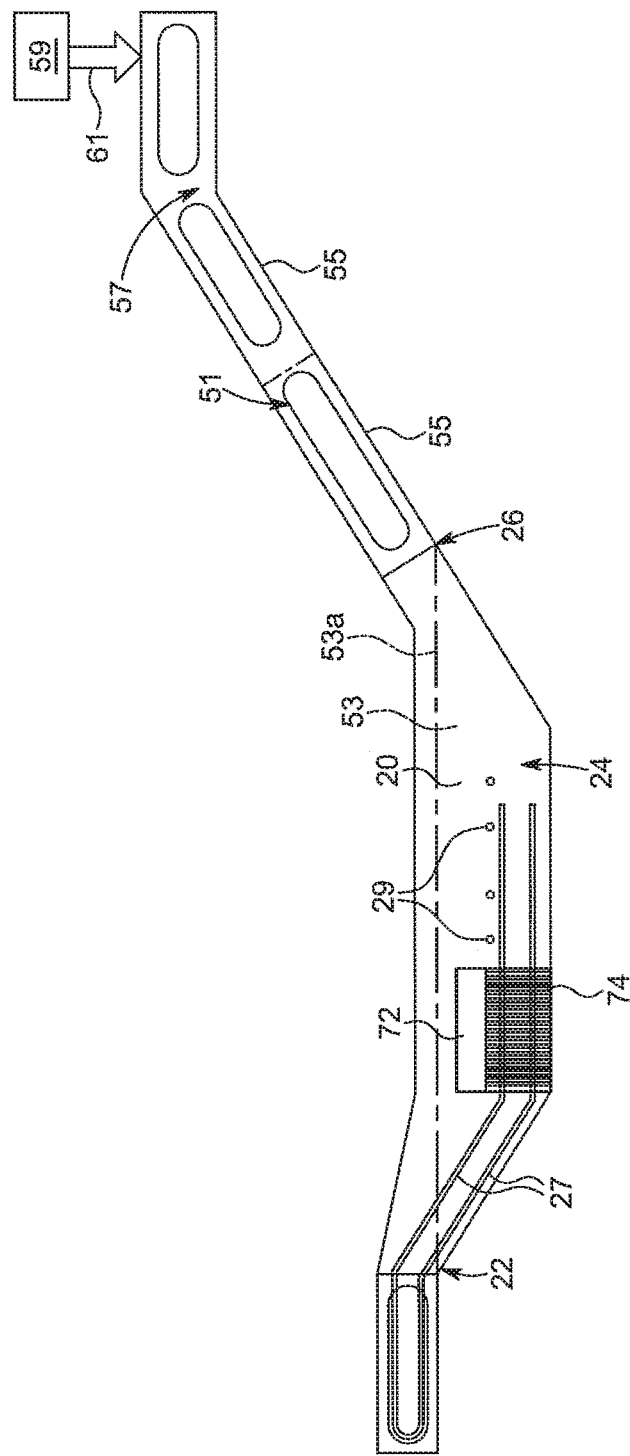
FIG. 10 is a sectional view of the dip tank and suction box of FIG. 8.

Referring now to FIGS. 8-10, an alternative form of drainage from the dip tank 20 is shown. Instead of a drain on the bottom of the dip tank, a suction box 70 is provided to the side of the dip tank 20. The suction box 70 includes a box attached adjacent to an aperture 72 that is cut in the side wall of the dip tank 20. The suction box 70 is separated from the dip tank 20 by a plurality of round bars 74 that act as a screen to prevent the ingress of larger pieces of meat product into the suction box. The bars 74 do not extend all the way to the top of the aperture 72, so that fluid can flow in easily to the suction box, which enables sensors in the box to detect that a sufficient level of liquid is present in the dip tank. For example, a gap of 3-4" may be left between the top of the bars 74 and the top of the aperture 72. This prevents the bars 74 from becoming clogged with smaller meat particulates that may interfere with the operation of sensors 76 in the box, for example, pressure transducers from which the fluid level in the dip tank 20 can be calculated. By placing the sensors in the suction box 70, they can be more easily cleaned or replaced when needed, and by allowing for free flow of fluid into the box 70, the sensors can measure the fluid level in the tank 20 accurately. If needed, the suction box 70 can be briefly separated from the dip tank 20 using a solid plate, so that the sensors may be cleaned while the system is still running, and without stopping the conveyor 27 and bringing the processing system offline in the middle of a shift. Larger meat parts do not clog the suction box bars 74 even with an aperture above the bars, as the larger parts are heavier and remain on the conveyor 27, and are thus prevented from entering the suction box (and hence the recycling conduits) by the bars 74 acting as a filter. One or more drain holes 68 are provided in the base or sides of the suction box 70, to suction away the antimicrobial solution for filtering.

As introduced above, the dip tank 20 illustrated in FIGS. 8 and 10 are configured with an outlet section 26 comprising a drip pan 51. The drip pan 51 may include a downstream length of the outlet section 26 with respect to the central section 24. The drip pan 51 may be integral with the length of the outlet section 26 or may be provided by one or more lengths of modular drip pan extensions 55 that may be coupled to the outlet section 26 to extend the length of the drip pan 51 along the outlet section. The drip pan 51 is configured to catch excess antimicrobial solution that associates with the meat products or conveyor after passing through the central section 24. In this embodiment, the drip pan 51 is positioned at an inclined angle away from the central section 24 to direct the excess antimicrobial solution caught by the drip pan 51 back toward the antimicrobial solution 53 within the central section 24 of the dip tank 20. Sensors configured to detect meat products conveyed along the conveyor may be placed along the outlet section 26. For example, in one embodiment, photo eye sensors are positioned adjacent to the conveyor 27 to detect meat products conveyed along the drip pan 51.

The dip tank 20 also includes a stop drip pan 57 downstream of the drip pan 51. The stop drip pan 57 is configured to isolate a rinse solution, which may be applied to the meat products during a rinse application 59, from being recycled with the antimicrobial solution caught by the drip pan 51 or otherwise entering the antimicrobial solution 53. The rinse application 59 may include one or more spray bars having spray nozzles, e.g., vee-jet nozzles for directing the rinse solution 61 onto the meat products after the meat products have been removed from the dip tank 20. The nozzles may be positioned to direct rinse solution 61 to completely cover the width of the conveyor and hence the meat products conveyed on the conveyor 27. The stop drip pan 57 may include a barrier such as a projection or gap positioned between the drip pan 51 and rinse application 59 configured to maintain separation of the rinse solution 61 and the drip pan 51. When a gap is used, rinse solution 61 may be directed toward the stop drip pan 57 which may include a drain for collecting rinse solution 61 following application. In the illustrated embodiment, the stop drip pan 57 includes a length that is horizontal or declined with respect to the drip pan 51 or separated from the drip pan 51, e.g., includes a gap, to maintain separation of the rinse solution 61 from the antimicrobial solution 53. Accordingly, the stop drip pan 57 may be configured to stop rinse solution 61 from diluting the antimicrobial solution 53.

The matter set forth in the foregoing description and accompanying drawings is offered by way of illustration only and not as a limitation. While the systems, methods, compositions, and devices for recycling of antimicrobial solution have been described and illustrated in connection with certain embodiments, many variations and modifications will be evident to those skilled in the art and may be made without departing from the spirit and scope of the disclosure. For example, the systems, methods, compositions, and devices disclosed herein have been identified, adapted to, and designed for food processing use, and particularly to processing of chicken and other poultry parts. Those having skill in the art will understand upon reading the present disclosure that the subject matter may be applied to other processing uses. The disclosure is thus not to be limited to the precise details of methodology or construction set forth above as such variations and modification are intended to be included within the scope of the disclosure.

This specification has been written with reference to various non-limiting and non-exhaustive embodiments. However, it will be recognized by persons having ordinary skill in the art that various substitutions, modifications, or combinations of any of the disclosed embodiments (or portions thereof) may be made within the scope of this specification. Thus, it is contemplated and understood that this specification supports additional embodiments not expressly set forth in this specification. Such embodiments may be obtained, for example, by combining, modifying, or reorganizing any of the disclosed steps, components, elements, features, aspects, characteristics, limitations, and the like, of the various non-limiting and non-exhaustive embodiments described in this specification. In this manner, Applicant reserves the right to amend the claims during prosecution to add features as variously described in this specification, and such amendments comply with the requirements of 35 U.S.C. §§ 112(a) and 132(a).

What is claimed is:

1. An antimicrobial application system, comprising:
a tank comprising a liquid antimicrobial solution;
a conveyor to convey food items through the tank, such that food items conveyed on the conveyor are dipped in the liquid antimicrobial solution;
at least two discharge nozzles for spraying liquid antimicrobial solution into the tank, wherein the discharge nozzles are positioned above the level of the conveyor but below a top level of the liquid antimicrobial solution such that food items conveyed on the conveyor are agitated by the force of the spray from the discharge nozzles; and
a suction box comprising a sensor, wherein the suction box is engaged with and in fluid communication with the tank, and wherein the sensor measures a level of the liquid antimicrobial solution in the tank.

2. The antimicrobial application system according to claim 1,
wherein the suction box further comprises:
a bottom wall;
at least one side wall extending from the bottom wall;
one or more drain holes through the bottom wall, the at least one side wall, or a combination thereof; and
wherein the tank further comprises an aperture; and
wherein a portion of the aperture is covered by the at least one side wall of the suction box.

3. The antimicrobial application system according to claim 2, further comprising a filter screen disposed within the aperture.

4. The antimicrobial application system according to claim 3, wherein the filter screen comprises a plurality of rods.

5. The antimicrobial application system according to claim 3, wherein, the aperture has a first height and the filter screen has a second height, wherein the first height is greater than the second height.

6. The antimicrobial application system according to claim 2, further comprising a pump for withdrawing the liquid antimicrobial solution through the one or more drain holes.

7. The antimicrobial application system according to claim 2, wherein the sensor is a pressure transducer located in the bottom wall of the suction box.

8. The antimicrobial application system according to claim 2, wherein the suction box comprises three side walls.

9. The antimicrobial application system according to claim 3, wherein the at least one side wall has a first height and the filter screen has a second height, wherein the first height is greater than the second height.

10. The antimicrobial application system according to claim 1, wherein the tank further comprises:
an outlet section comprising a drip pan positioned to catch liquid antimicrobial solution that drips from the food items after the food items conveyed on the conveyor exit the liquid antimicrobial solution.

11. The antimicrobial application system according to claim 10, wherein the tank further comprises:
a stop drip pan positioned to isolate a rinse solution applied to the food items in a rinse application from the liquid antimicrobial solution caught by the drip pan.

* * * * *